US010480382B2

United States Patent
Lee et al.

(10) Patent No.: US 10,480,382 B2
(45) Date of Patent: Nov. 19, 2019

(54) METHOD FOR DETECTING CATALYST DETERIORATION OF VEHICLE

(71) Applicants: Hyundai Motor Company, Seoul (KR); Kia Motors Corporation, Seoul (KR)

(72) Inventors: Dong-Hoon Lee, Gyeonggi-do (KR); Byung-Hoon Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 52 days.

(21) Appl. No.: 15/838,961

(22) Filed: Dec. 12, 2017

(65) Prior Publication Data

US 2019/0078490 A1    Mar. 14, 2019

(30) Foreign Application Priority Data

Sep. 8, 2017   (KR) ........................ 10-2017-0115169

(51) Int. Cl.
| | |
|---|---|
| *F01N 9/00* | (2006.01) |
| *F01N 3/08* | (2006.01) |
| *F01N 3/20* | (2006.01) |
| *F01N 3/10* | (2006.01) |
| *F01N 11/00* | (2006.01) |

(52) U.S. Cl.
CPC .......... *F01N 9/002* (2013.01); *F01N 3/0814* (2013.01); *F01N 3/0864* (2013.01); *F01N 3/0885* (2013.01); *F01N 3/101* (2013.01); *F01N 3/20* (2013.01); *F01N 9/00* (2013.01); *F01N 11/007* (2013.01); *F01N 2260/04* (2013.01); *F01N 2550/02* (2013.01); *F01N 2550/03* (2013.01); *F01N 2560/025* (2013.01); *F01N 2900/08* (2013.01); *F01N 2900/1624* (2013.01)

(58) Field of Classification Search
CPC combination set(s) only.
See application file for complete search history.

(56) References Cited

U.S. PATENT DOCUMENTS

| | | | |
|---|---|---|---|
| 9,896,988 B2 * | 2/2018 | Lee | F01N 3/0885 |
| 2001/0013221 A1 * | 8/2001 | Suzuki | F02D 41/0295 60/285 |
| 2005/0193722 A1 * | 9/2005 | Fujiwara | F02D 41/0295 60/285 |
| 2007/0113538 A1 * | 5/2007 | Kato | F01N 3/0864 60/276 |
| 2014/0336899 A1 * | 11/2014 | Uhrich | F01N 11/007 701/101 |
| 2016/0097337 A1 * | 4/2016 | Ito | F02D 41/0295 701/104 |
| 2016/0237926 A1 * | 8/2016 | Tanaka | F02D 41/1454 |

FOREIGN PATENT DOCUMENTS

JP    H06-159048 A    6/1994

\* cited by examiner

*Primary Examiner* — Binh Q Tran
(74) *Attorney, Agent, or Firm* — Mintz Levin Cohn Ferris Glovsky and Popeo, P.C.; Peter F. Corless

(57) ABSTRACT

A method for detecting catalyst deterioration in a vehicle includes executing a fuel-cut mode of an engine of the vehicle according to a operating state of the vehicle; calculating an oxygen storage capacity (OSC) of a catalyst using an oxygen sensor during the executing of the fuel-cut mode of the engine; and calculating catalyst deterioration based on the calculated OSC.

14 Claims, 4 Drawing Sheets

METHOD FOR DETECTING CATALYST DETERIORATION OF VEHICLE

CROSS-REFERENCE TO RELATED APPLICATION

This application claims the benefit of priority to Korean Patent Application No. 10-2017-0115169, filed on Sep. 8, 2017, which is hereby incorporated by reference in its entirety as if fully set forth herein.

BACKGROUND OF THE DISCLOSURE

Technical Field

Embodiments of the present disclosure relate generally to detecting catalyst deterioration in a vehicle and, more particularly, to a method for detecting catalyst deterioration by measuring an oxygen storage capacity of a catalyst.

Description of Related Art

A vehicle engine combusts fuel inside a cylinder, and uses heat energy generated by the combustion as power. Problematically, exhaust gas generated by the combustion contains harmful compounds such as nitrogen oxide resulting from combustion of fuel inside the cylinder, or carbon monoxide or hydrocarbon resulting from incomplete combustion.

In order to remove these harmful components from the exhaust gas, a catalyst is installed in an exhaust system of the vehicle. When the exhaust gas is rich, the catalyst releases absorbed oxygen and oxidizes harmful substances in the exhaust gas to reduce the exhaust gas. When the catalyst deteriorates due to long use, however, removal efficiency of a harmful substance is also degraded. In order to satisfy the exhaust gas emission standards, it is important to accurately determine a degree of catalyst deterioration.

When a catalyst is deteriorated, oxygen absorption ability of the catalyst is degraded, and thus a maximum absorbable oxygen amount is reduced. Conventionally, an oxygen amount that is absorbable by a catalyst converter is detected, and deterioration of the catalyst converter is determined on the basis of the detected oxygen amount. Therefore, in order to calculate an oxygen storage amount of the catalyst, an air-fuel ratio is modulated from a lean region to a rich region, and oxygen storage capacity (OSC) is calculated using a total amount of exhaust gas up to a time when a signal of an oxygen sensor disposed at a rear end of a catalyst indicates the rich region, and the air-fuel ratio, thereby detecting catalyst deterioration using the OSC.

However, when the air-fuel ratio of fuel is arbitrarily modulated from a lean direction to a rich direction, it may adversely affect fuel efficiency and the exhaust gas.

SUMMARY OF THE DISCLOSURE

Embodiments of the present disclosure are directed to a method capable of detecting a degree of catalyst deterioration by calculating oxygen storage capacity (OSC) of a catalyst according to an operation situation of a vehicle without arbitrarily modulating an air-fuel ratio.

In order to solve the above-described problems, according to the present disclosure, the OSC of the catalyst is calculated using that the air-fuel ratio of fuel is switched to a rich state when a fuel-cut mode is executed in a state in which the vehicle is in an overrun state without arbitrarily modulating the air-fuel ratio.

In accordance with embodiments of the present disclosure, a method for detecting catalyst deterioration in a vehicle includes: executing a fuel-cut mode of an engine of the vehicle according to a operating state of the vehicle; calculating an oxygen storage capacity (OSC) of a catalyst using an oxygen sensor during the executing of the fuel-cut mode of the engine; and calculating catalyst deterioration based on the calculated OSC.

When a predetermined condition for calculating the OSC of the catalyst is satisfied during the executing of the fuel-cut mode of the engine, the calculating of the OSC of the catalyst may be performed and the calculated OSC may be used in the calculating of the catalyst deterioration.

When an output voltage of the oxygen sensor is within a predetermined range during the executing of the fuel-cut mode of the engine, the calculating of the OSC of the catalyst may be performed and the calculated OSC may be used in the calculating of the catalyst deterioration.

When a predetermined amount of time passes after the executing of the fuel-cut mode of the engine begins, the calculating of the OSC of the catalyst may be performed and the calculated OSC may be used in the calculating of the catalyst deterioration.

When an exhaust gas flow rate is greater than or equal to a predetermined value after the executing of the fuel-cut mode of the engine begins, the calculating of the OSC of the catalyst may be performed, and the calculated OSC may be used in the calculating of the catalyst deterioration.

When a temperature of the catalyst is within a predetermined range after the executing of the fuel-cut mode of the engine begins, the calculating of the OSC of the catalyst may begin.

The method may further include measuring a duration for which the fuel-cut mode is not executed before the executing of the fuel-cut mode of the engine begins. When the duration for which the fuel-cut mode is not executed is greater than or equal to a predetermined value, the calculating of the OSC of the catalyst may be performed, and the calculated OSC may be used in the calculating of the catalyst deterioration.

When a currently calculated OSC is greater than a previously calculated OSC by a predetermined value or more, the currently calculated OSC may not be used in the calculating of the catalyst deterioration.

The calculating of the OSC of the catalyst may include integrating an oxygen flow rate from a time when the executing of the fuel-cut mode of the engine begins to a time at which a measured signal from the oxygen sensor indicates a lean region of an air-fuel ratio, thereby obtaining an integrated oxygen value; and setting the OSC of the catalyst as equal to the integrated oxygen value.

More preferably, the calculating of the catalyst deterioration includes comparing an OSC of a catalyst that is not used and an OSC of a boundary catalyst, which has purification ability of a boundary value of an exhaust gas emission standard, with the calculated OSC; and calculating the catalyst deterioration based further on the comparison.

The calculating of the OSC of the catalyst may be performed a predetermined number of times or more, and the calculating of the catalyst deterioration may be performed using an average value of the OSCs calculated the predetermined number of times or more.

The calculating of the OSC of the catalyst may include filtering a measured signal of the oxygen sensor when a predetermined condition is satisfied; and calculating the OSC using the filtered signal.

The method may further include performing catalyst purging control for regenerating the catalyst using the calculated catalyst deterioration.

The method may further include performing catalyst activation control using the calculated catalyst deterioration.

The method may further include, when the calculated catalyst deterioration exceeds a predetermined boundary value, notifying a driver of the vehicle that the catalyst deterioration exceeds the predetermined boundary value.

In accordance with the method for detecting catalyst deterioration described above, a degree of catalyst deterioration can be detected by calculating OSC through integration of an oxygen flow rate in a fuel-cut mode section without arbitrarily modulating an air-fuel ratio. Therefore, a fuel amount that is unnecessarily consumed for a fuel modulation can be reduced so that fuel efficiency can be improved, and degradation of driving ability due to an air-fuel ratio modulation can be prevented to improve the driving ability. Further, when the catalyst deterioration calculated by the above-described method is used, catalyst heating or catalyst purging can be optimally controlled such that fuel efficiency can be improved and exhaust gas emission can be reduced.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1:
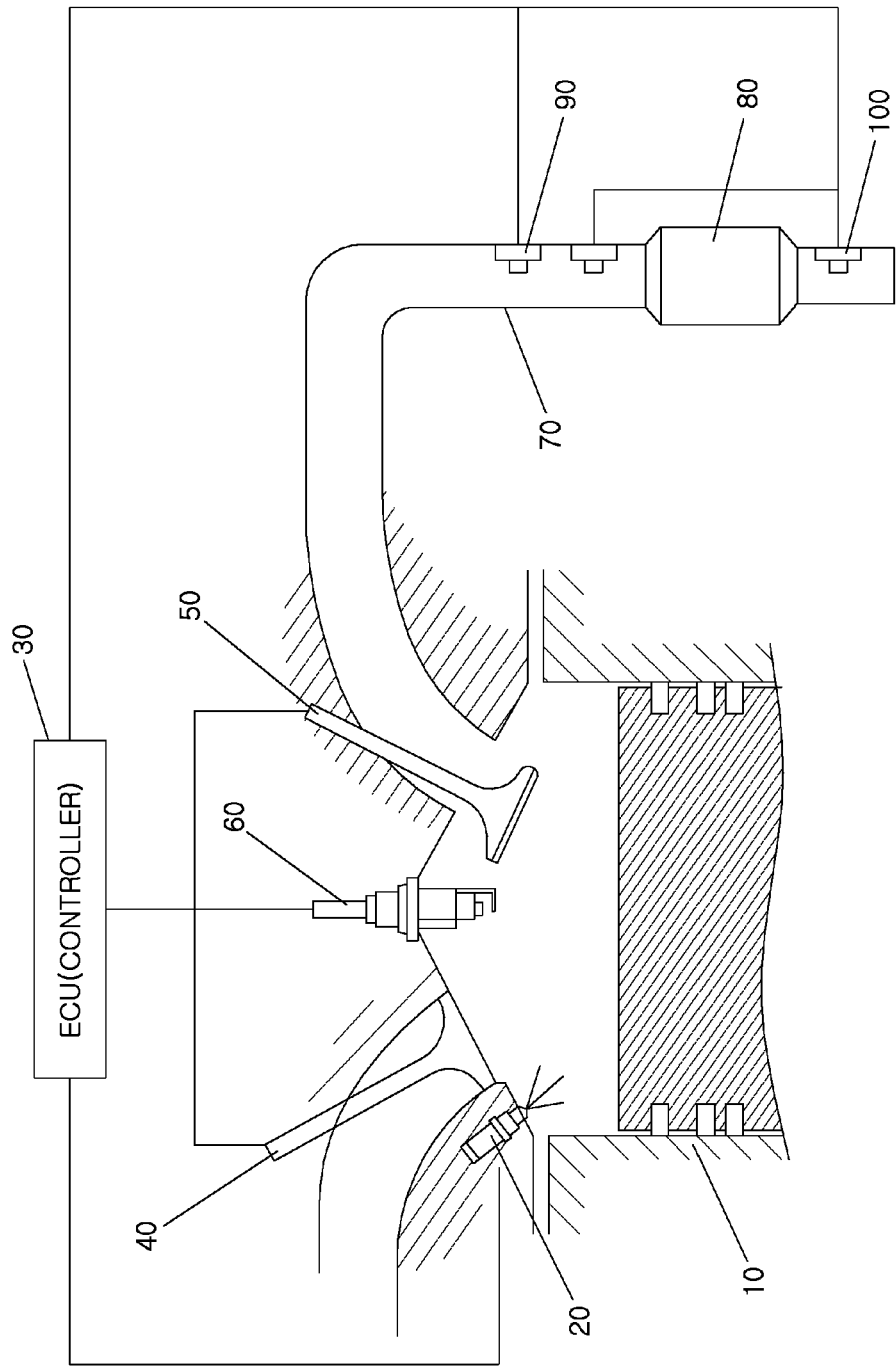
FIG. 1 is a diagram schematically illustrating a configuration of an exhaust system of a vehicle to which a method for detecting catalyst deterioration according to embodiments of the present disclosure is applicable.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, preferred embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller/control unit. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, FIG. 1 is a diagram schematically illustrating a configuration of an exhaust system of a vehicle to which a method for detecting catalyst deterioration according to embodiments of the present disclosure is applicable.

In an engine illustrated in FIG. 1, fresh air supplied from an intake system of a vehicle is supplied to a combustion chamber inside a cylinder 10 through an intake valve 40. Further, fuel that is forcibly transmitted from a fuel tank is supplied to the combustion chamber inside the cylinder 10 through an injector 20. Although the injector 20 directly injects the fuel into the combustion chamber in the engine illustrated in FIG. 1, a method according to embodiments of the present disclosure is not limited to the above-described engine, and the method may also be applicable to an engine in which a mature of fuel and air is supplied into the combustion chamber through the intake valve 40.

The fuel injected into the combustion chamber is ignited by an igniter 60 to be combusted. Exhaust gas that is generated after the combustion is discharged to an exhaust path 70 of the exhaust system through an exhaust valve 50. Although FIG. 1 illustrates a case in which the fuel is spark-ignited by the igniter 60, even when the fuel is compression-ignited as in a diesel engine, the preferred embodiment according to the present disclosure can be absolutely applied thereto.

Harmful components contained in the exhaust gas, which is discharged to the exhaust path 70, is removed by a three-way catalyst in a catalytic converter 80 to be discharged to the outside of the vehicle. Meanwhile, an exhaust gas flow rate sensor 90 configured to detect a flow rate of exhaust gas is provided at the exhaust path 70, and an oxygen sensor 100 configured to detect an oxygen concentration in exhaust gas is installed at each of an upstream side and a downstream side of the catalytic converter 80.

An electronic control unit (ECU) 30 (e.g., a controller) detects whether to supply fuel from the injector 20 to an interior of the cylinder 10 to determine whether to execute a fuel-cut mode, and, as will be described below, the ECU 30 detects oxygen storage capacity (OSC) and catalyst deterioration by receiving exhaust gas flow rate information and oxygen concentration information from the exhaust gas flow rate sensor 90 and the oxygen sensor 100, respectively.

Further, when the catalyst deterioration is detected, the ECU 30 may control the injector 20, the intake valve 40, the exhaust valve 50, and the igniter 60 according to the detected catalyst deterioration to adjust a fuel injection amount, a fuel ignition timing, and the like, thereby performing catalyst activation control, catalyst purging control, and the like.

Figure 2:
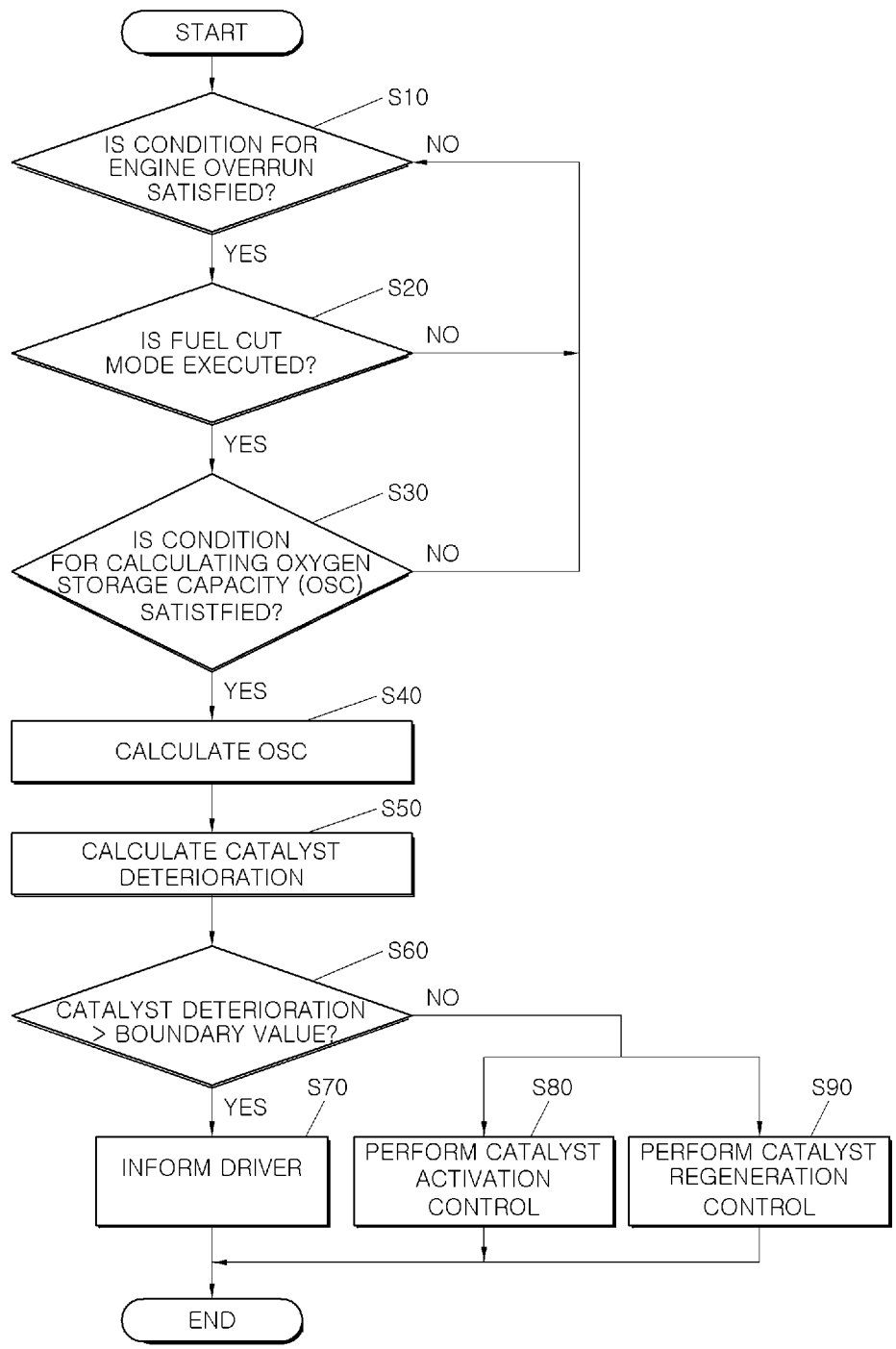
FIG. 2 is a flowchart illustrating the method for detecting catalyst deterioration according to embodiments of the present disclosure.

FIG. 2 is a flowchart illustrating the method for detecting catalyst deterioration according to embodiments of the present disclosure. Hereinafter, the method for detecting catalyst deterioration, which is performed in the ECU 30, will be described in detail with reference to FIG. 2.

In order to detect catalyst deterioration, the ECU 30 first determines whether an operation state of the vehicle corresponds to an overrun state (S10). The overrun state may be determined from information on a vehicle speed, the number of revolutions of the engine, a magnitude of a pressure acting on a surge tank, and a cooling water temperature of the engine. When the overrun state of the vehicle is detected, a fuel-cut mode is executed to return the operation state of the engine to a normal state.

Next, the ECU 30 determines whether to execute the fuel-cut mode (S20). In an example illustrated in FIG. 2, the fuel-cut mode is performed to return the overrun state to a normal state while the vehicle is traveling, but the present disclosure is not limited thereto. In a situation in which the fuel-cut mode is performed even not in the case of overrun state, the method for detecting catalyst deterioration according to the present disclosure can be applied thereto. For example, even in a case in which the fuel-cut mode is performed to improve fuel efficiency according to an operating state of the vehicle although the case does not correspond to the overrun state, the method for detecting catalyst deterioration according to embodiments of the present disclosure can be applied thereto.

When the fuel-cut mode is executed, since a supply of the fuel to the cylinder 10 is blocked, air that does not completely contain the fuel flows into the exhaust path 70.

When the fuel-cut mode is determined to be performed, the ECU 30 determines whether a condition for calculating an oxygen storage amount is satisfied (S30), and, when the condition for calculating an oxygen storage amount is satisfied, the ECU 30 calculates an oxygen storage amount of the three-way catalyst in the catalytic converter 80 using a signal from the oxygen sensor 100 (S40).

Here, the condition for calculating an oxygen storage amount refers to conditions that should be satisfied in order to stably accurately calculate the oxygen storage amount. Conditions for calculating the oxygen storage amount, which are defined in the preferred embodiment of the present disclosure, will be described in more detail below, and, hereinafter, a method for calculating an oxygen storage amount will be first described.

Figure 3:
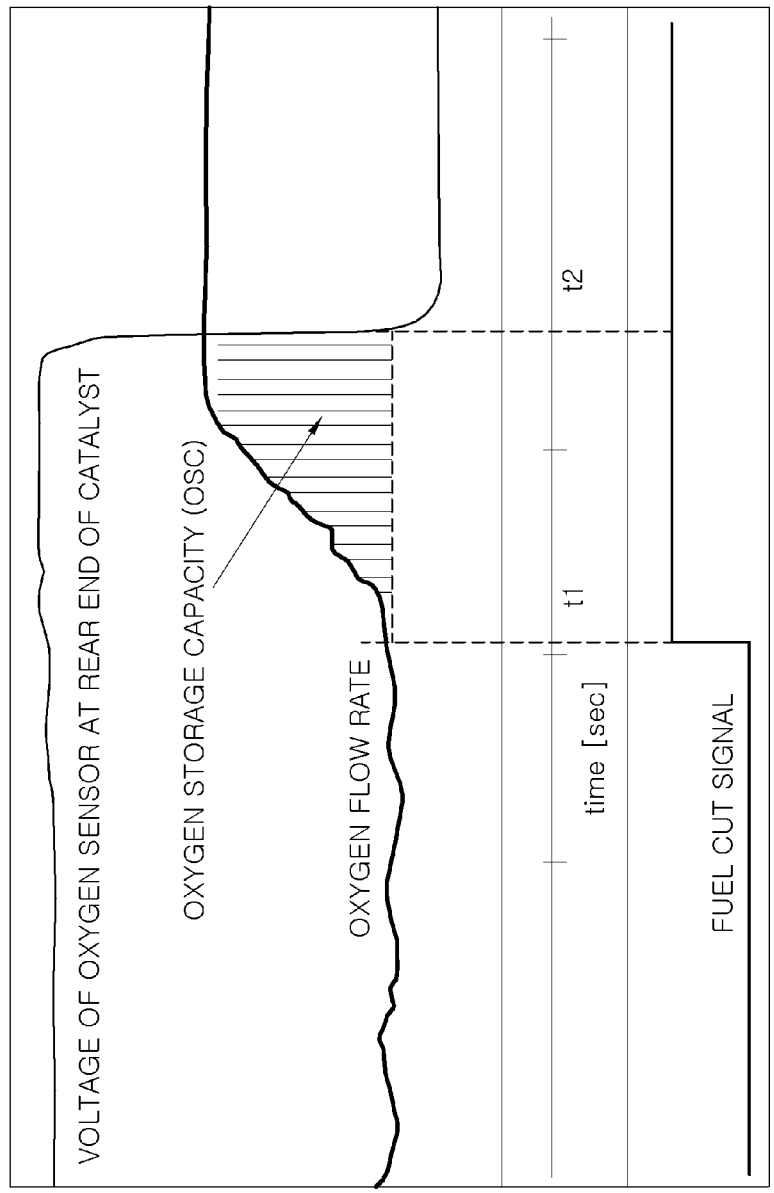
FIG. 3 is a signal diagram illustrating signals which are used to calculate oxygen storage capacity (OSC) of a catalyst according to embodiments of the present disclosure.

As shown in FIG. 3, on the basis of a precondition that the condition for calculating the oxygen storage amount in the operation S30 is satisfied, an OSC is calculated by integrating an oxygen flow rate from a time when the fuel-cut mode is executed to a time when a voltage of an oxygen sensor, which is installed at a rear end of the catalyst among the oxygen sensors 100, indicates a lean state of the air-fuel ratio.

As described above, when the fuel-cut mode is executed, since the supply of the fuel to the cylinder 10 is blocked, the air that does not completely contain the fuel flows into the exhaust path 70. Thus, an oxygen concentration in the exhaust gas is increased, and the excessively increased oxygen is absorbed by the three-way catalyst in the catalytic converter 80. Further, when the fuel-cut mode is maintained and a mixture in a lean state beyond the OSC of the catalyst is continuously supplied, the air-fuel ratio measured by the oxygen sensor, which is installed at the rear side of the catalyst among the oxygen sensors 100, indicates a lean state like an air-fuel ratio at the upstream of the catalyst.

Therefore, an excessive oxygen amount of the exhaust gas, which passes through the catalyst from a time t1 when the fuel-cut mode is performed to a time t2 when an air-fuel ratio state indicated by a voltage, which is output from the oxygen sensor at the rear end of the catalyst in the catalytic converter 80, is switched to the lean state, corresponds to the OSC of the catalyst.

Consequently, as shown in FIG. 3, in the present disclosure, the OSC of the catalyst is calculated by integrating the oxygen flow rate from the time when the fuel-cut mode is executed to the time when the output voltage from the oxygen sensor, which is located at the rear end of the catalyst among the oxygen sensors 100, is dropped below a predetermined reference (i.e., an air-fuel ratio lean state).

Here, the oxygen flow rate may be calculated from an oxygen concentration in the exhaust gas at the upstream side of the catalyst, which is detected by an oxygen sensor located at a front end of the catalyst among the oxygen sensors 100, and an exhaust gas flow rate detected from the exhaust gas flow rate sensor 90.

As described above, since the calculation of the OSC of the catalyst uses the oxygen flow rate detected by the oxygen sensors 100 and the exhaust gas flow rate sensor 90 in the fuel-cut mode, in order to stably accurately control the OSC, it should be premised on a state in which a fuel-cut mode state, the oxygen flow rate, and the exhaust gas flow rate can be stably detected.

To this end, according to the embodiments of the present disclosure, the OSC of the catalyst is calculated when the output voltage of the oxygen sensor 100 is within a predetermined range. A material of a sensing element of the oxygen sensor 100 is activated at about 700° C. to have an improved sensing rate.

Therefore, the oxygen sensor 100 is typically heated and activated by a heater provided therein. Consequently, before the oxygen sensor 100 is activated, that is, before the output voltage of the oxygen sensor 100 becomes to be equal to or greater than a predetermined value, it is difficult to accurately detect the oxygen concentration of the exhaust gas, so that the output voltage of the oxygen sensor 100 should become to be equal to or greater than a predetermined lower limit value.

Meanwhile, in order to accurately calculate the OSC, a lower limit value of the output voltage of the oxygen sensor 100 as well as an upper limit value thereof may also be considered. When the fuel is resided on the exhaust path 70 of the exhaust system, due to vaporization of the residual fuel, the air-fuel ratio measured by the oxygen sensor 100 may be detected to be excessively greater than an actual amount of fuel supplied into the combustion chamber. In this case, since an air-fuel ratio is difficult to be accurately measured, it is preferable that the upper limit value of the output voltage of the oxygen sensor 100 is defined, and, when the output voltage of the oxygen sensor 100 is within a range of the upper limit value, the OSC is calculated.

In another example, when a predetermined amount of time passes after the fuel-cut mode is executed, the OSC of the catalyst is calculated. The oxygen sensor 100 installed at the rear end of the catalyst has a hysteresis characteristic when the air-fuel ratio state is switched to the lean state or the rich state according to components of the exhaust gas. Accordingly, a detection result of the oxygen sensor 100 may be inaccurate for a predetermined time after the fuel-cut mode is executed. Therefore, for accurate measurement, it is preferable to calculate the OSC of the catalyst when a predetermined time passes after the fuel-cut mode is executed.

In still another example, when the flow rate of the exhaust gas is equal to or greater than a predetermined value after the fuel-cut mode is executed, the OSC of the catalyst is calculated and the calculated OSC is used for a catalyst deterioration calculation. Since the oxygen amount contained in the exhaust gas is small when the exhaust gas flow rate is not sufficient, It is difficult to detect the oxygen concentration with predetermined accuracy or more. Consequently, for accurate measurement, it is preferable that the exhaust gas flow rate is monitored through the exhaust gas flow rate sensor 90, and, when the exhaust gas flow rate is equal to or greater than a predetermined value after the fuel-cut mode is executed, the OSC of the catalyst is calculated.

In yet another example, it is preferable to begin the calculation of the OSC when a catalyst temperature is within a predetermined range after the fuel-cut mode of the engine is executed. The catalyst is activated only when heated over a predetermined temperature, and thus a catalyst action begins. For example, in the case of a three-way catalyst which is most widely used as a catalyst installed at the catalytic converter 80, a catalyst action begins only when the three-way catalyst is heated and thus a catalyst temperature thereof reaches about 250° C. or more. Therefore, in order to accurately calculate the OSC, it is preferable that a catalyst temperature is monitored through a temperature sensor installed in the catalytic converter 80, and, when the catalyst temperature is equal to or greater than a predetermined temperature after the fuel-cut mode is executed, the OSC is calculated.

In yet another example, a duration for which the fuel-cut mode is not executed is measured before the fuel-cut mode is executed, and, when the duration for which the fuel-cut mode is not executed is equal to or greater than a predetermined value, the OSC of the catalyst is calculated and then the calculated OSC is used for a catalyst deterioration calculation. Due to a driving habit of the driver repeatedly accelerating and decelerating, or repeatedly driving an accelerator pedal according to road conditions, there is a case in which the fuel-cut mode state and a normal operating state are repeated for a short period of time. In such a situation, a time for which the fuel-cut mode is terminated to be switched to a normal operating state and then the fuel-cut mode is re-executed is excessively shortened. In this case, since the fuel-cut mode is executed in a state in which the air-fuel ratio detected by the oxygen sensor 100 at the rear end of the catalyst is not in a sufficient rich state before the fuel-cut mode is executed, there is a concern that the OSC calculation after the fuel-cut mode is executed is to be inaccurate. Further, the fuel-cut mode state and the normal operating state are repeated for a short period of time, so that a measured value of the oxygen concentration is also to be unstable. Consequently, in order to stably calculate the OSC, the ECU 30 measures the duration time for which the fuel-cut mode is not performed before the beginning of the fuel-cut mode, and, when the duration time for which the fuel-cut mode is not performed is equal to or greater than a predetermined value, the ECU 30 calculates the OSC of the catalyst.

Meanwhile, in yet another example, when a currently calculated OSC is greater than a previously calculated OSC by a predetermined value or more, the ECU 30 controls the currently calculated OSC not to be used for the catalyst deterioration calculation. The OSC calculated by the ECU 30 when the catalyst deterioration is previously detected is stored in a storage space inside the ECU 30. Further, the ECU 30 compares the stored OSC with an OSC calculated when the catalyst deterioration is subsequently detected. When deterioration of the catalyst progresses, the OSC is also deteriorated. Consequently, after the OSC is previously measured and then a predetermined time passes, since the deterioration of the catalyst progresses to some extent, a magnitude of a newly measured OSC is to be smaller than that of the previously measured OSC.

In spite of having the small magnitude, when the newly measured OSC is greater than the previously stored OSC, it may be reasonably suspected that an error occurs during measurement of the newly measured OSC. Accordingly, in yet another example, when the currently calculated OSC is greater than the previously calculated OSC by a predetermined value or more, the currently calculated OSC is determined to have insufficient reliability, so that the currently calculated OSC is not used in a catalyst subsequent deterioration calculation (S50).

As described above, when the condition for calculating the OSC is satisfied, the ECU 30 calculates the OSC (S40), and calculates the catalyst deterioration using the calculated OSC (S50).

Figure 4:
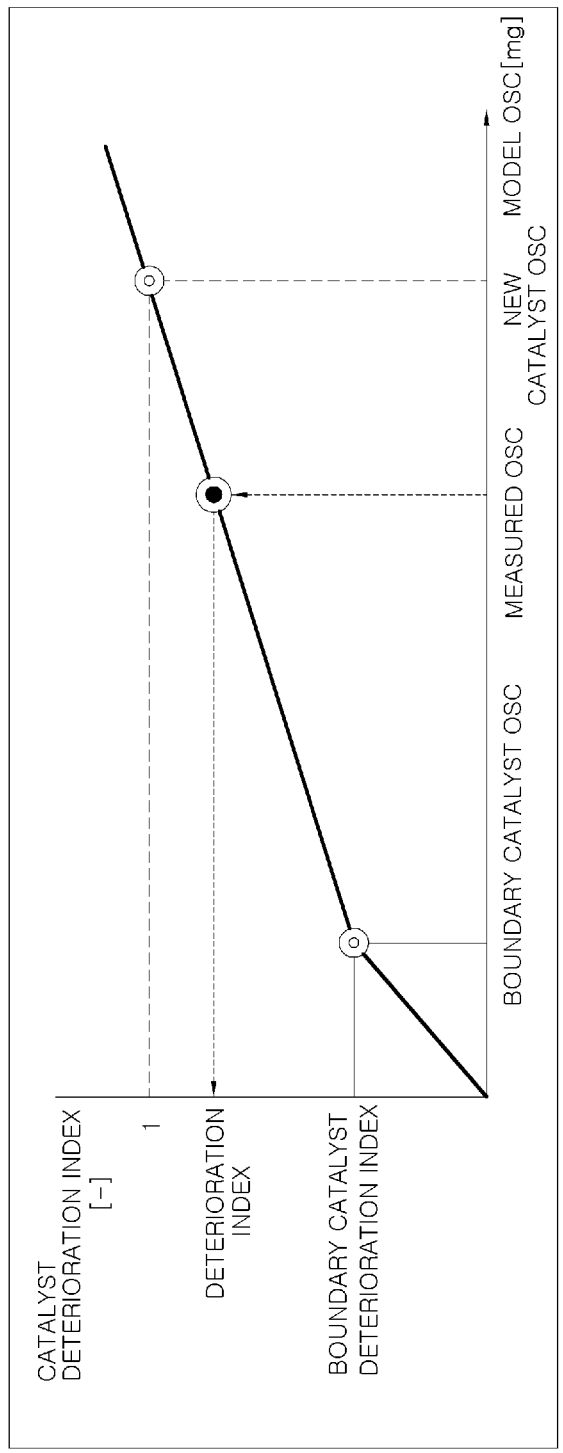
FIG. 4 is a graph illustrating a relationship between the OSC and a catalyst deterioration index which are used to detect catalyst deterioration from the OSC of the catalyst.

In the graph of FIG. 4, a relationship between the OSC and a catalyst deterioration index which are used to detect catalyst deterioration from the OSC of the catalyst is illustrated.

In the present disclosure, a degree of the catalyst deterioration is determined by referring to an OSC of a new catalyst that is not used, and an OSC of a boundary catalyst having filtering capability corresponding to an upper boundary value of the exhaust gas emission standard on the basis of the OSC calculated in the operation S40.

To this end, as shown in FIG. 4, a catalyst deterioration index corresponding to the OSC of the new catalyst is set to 1, and a catalyst deterioration index corresponding to the OSC of the boundary catalyst is set to a value that is less than 1. Then, a relationship between the catalyst deterioration index of the new catalyst and the deterioration index of the boundary catalyst with respect to the OSC is compared with a measured OSC of a current catalyst, so that a catalyst deterioration index of the current catalyst is obtained by interpolation. In FIG. 4, the catalyst deterioration indexes of the new catalyst and the boundary catalyst are illustrated to have a linear relationship with respect to the OSC, but the present disclosure is not limited thereto and may have various relationships according to catalyst characteristics.

For a more accurate catalyst deterioration calculation, in the calculating of the catalyst deterioration (S50) in embodiments of the present disclosure, the calculation of the OSC (S40) is performed a predetermined number of times or more, and an average value of the OSCs measured the predetermined number of times or more is used for the catalyst deterioration calculation.

In addition, for an accurate catalyst degradation calculation, the measured signal of the oxygen sensor 100 may be filtered to remove unnecessary noise therefrom, and then the OSC may be calculated on the basis of the filtered signal, and the calculated OSC may be used for the catalyst deterioration calculation.

Next, the ECU 30 determines whether the calculated catalyst deterioration exceeds a predetermined boundary value (S60). When the catalyst deterioration is not improved and thus high catalyst deterioration is still maintained after a catalyst purging and the like are performed, the ECU 30 informs the driver of an abnormal state of the catalyst by flickering a warning lamp provided on an instrument panel of a driver's seat so that it is preferable for the driver to induce replacement of the catalyst.

Further, the ECU 30 may preferably utilize the calculated catalyst deterioration when the catalyst is regenerated or activated.

As described above, the catalyst action is activated only when the catalyst is heated over a predetermined temperature. However, a heating time required for activating the catalyst and a heat supply amount required for heating the catalyst are varied according to the degree of the catalyst deterioration. For example, in the case of a new catalyst of which deterioration does not progress, the new catalyst may be activated by supplying a small heat supply amount for a short period of time in comparison with a catalyst in which deterioration progresses to some extent. Therefore, when catalyst activation control is performed in a batch without considering the progress of catalyst deterioration, heat is unnecessarily consumed, thus degrading fuel efficiency.

Consequently, the ECU 30 performs optimized catalyst activation control by adjusting a time required for heating the catalyst when the catalyst activation control is performed, or a heat supply amount when the catalyst is heated on the basis of the degree of the catalyst deterioration calculated in the operation S50 (S80).

Meanwhile, when a fuel cut-off control is performed and then a normal injection control is performed again, the catalyst is not restored to have original purification efficiency due to overcharged oxygen, thereby directly discharge a large amount of exhaust gas (NOx).

Consequently, in order to stably maintain purification efficiency of the catalyst after the fuel-cut mode is executed, the oxygen overcharged at the catalyst during the fuel cut-off control should be rapidly removed therefrom. To this end, the ECU 30 intentionally controls the fuel to be rich injected. As described above, when the air-fuel ratio is controlled to be rich, the oxygen adsorbed to the catalyst in the catalytic converter 80 is released. When the catalyst is deteriorated, an oxygen release characteristic when rich fuel is injected is also varied. Consequently, when the catalyst purging is performed without considering the catalyst deterioration, purification efficiency of the exhaust gas may be degraded or damage to the catalyst may occur.

Accordingly, in the present disclosure, optimized catalyst purging control is performed by differently adjusting a degree of fuel rich and a catalyst purging time according to the calculated degree of the catalyst deterioration (S90).

In accordance with the method for detecting catalyst deterioration described herein, a degree of catalyst deterioration can be detected by calculating OSC through integration of an oxygen flow rate in a fuel-cut mode section without arbitrarily modulating an air-fuel ratio. Therefore, fuel that is unnecessarily consumed for a fuel modulation can be reduced so that fuel efficiency can be improved, and an air-fuel ratio modulation can be prevented to improve the driving ability.

Further, as described above, when the catalyst deterioration calculation as described herein is performed, catalyst heating or catalyst purging can be optimally controlled such that fuel efficiency can be improved and exhaust gas emission can be reduced.

While the present disclosure has been described with respect to certain embodiments, it will be apparent to those skilled in the art that various changes and modifications may be made without departing from the spirit and scope of the disclosure as defined in the following claims.

What is claimed is:

1. A method for detecting catalyst deterioration in a vehicle, comprising:
    executing, by a controller, a fuel-cut mode of an engine of the vehicle according to an operating state of the vehicle;
    calculating, by the controller, an oxygen storage capacity (OSC) of a catalyst using an oxygen sensor during the executing of the fuel-cut mode of the engine; and
    calculating, by the controller, catalyst deterioration based on the calculated OSC,
    wherein the calculating of the OSC of the catalyst comprises:
        integrating an oxygen flow rate from a time when the executing of the fuel-cut mode of the engine begins to a time at which a measured signal from the oxygen sensor installed at a rear end of the catalyst, indicates a lean region of an air-fuel ratio, thereby obtaining an integrated oxygen value; and
        setting the OSC of the catalyst as equal to the integrated oxygen value.

2. The method of claim 1, wherein, when a predetermined condition for calculating the OSC of the catalyst is satisfied during the executing of the fuel-cut mode of the engine, the calculating of the OSC of the catalyst is performed, and the calculated OSC is used in the calculating of the catalyst deterioration.

3. The method of claim 2, wherein, when an output voltage of the oxygen sensor is within a predetermined range during the executing of the fuel-cut mode of the engine, the calculating of the OSC of the catalyst is performed, and the calculated OSC is used in the calculating of the catalyst deterioration.

4. The method of claim 2, wherein, when a predetermined amount of time passes after the executing of the fuel-cut mode of the engine begins, the calculating of the OSC of the catalyst is performed, and the calculated OSC is used in the calculating of the catalyst deterioration.

5. The method of claim 2, wherein, when an exhaust gas flow rate is greater than or equal to a predetermined value after the executing of the fuel-cut mode of the engine begins, the calculating of the OSC of the catalyst is performed, and the calculated OSC is used in the calculating of the catalyst deterioration.

6. The method of claim 2, wherein, when a temperature of the catalyst is within a predetermined range after the executing of the fuel-cut mode of the engine begins, the calculating of the OSC of the catalyst begins.

7. The method of claim 2, further comprising:
    measuring a duration for which the fuel-cut mode is not executed before the executing of the fuel-cut mode of the engine begins,
    wherein, when the duration for which the fuel-cut mode is not executed is greater than or equal to a predetermined value, the calculating of the OSC of the catalyst is performed, and the calculated OSC is used in the calculating of the catalyst deterioration.

8. The method of claim 2, wherein, when a currently calculated OSC is greater than a previously calculated OSC by a predetermined value or more, the currently calculated OSC is not used in the calculating of the catalyst deterioration.

9. The method of claim 3, wherein the calculating of the catalyst deterioration comprises:
comparing an OSC of a catalyst that is not used and an OSC of a boundary catalyst, which has purification ability of a boundary value of an exhaust gas emission standard, with the calculated OSC; and
calculating the catalyst deterioration based further on the comparison.

10. The method of claim 3, wherein:
the calculating of the OSC of the catalyst is performed a predetermined number of times or more, and
the calculating of the catalyst deterioration is performed using an average value of the OSCs calculated the predetermined number of times or more.

11. The method of claim 3, wherein the calculating of the OSC of the catalyst comprises:
filtering a measured signal of the oxygen sensor when a predetermined condition is satisfied; and
calculating the OSC using the filtered signal.

12. The method of claim 3, further comprising:
performing catalyst purging control for regenerating the catalyst using the calculated catalyst deterioration.

13. The method of claim 3, further comprising:
performing catalyst activation control using the calculated catalyst deterioration.

14. The method of claim 3, further comprising:
when the calculated catalyst deterioration exceeds a predetermined boundary value, notifying a driver of the vehicle that the catalyst deterioration exceeds the predetermined boundary value.

* * * * *